(12) United States Patent
Di Nunzio et al.

(10) Patent No.: US 6,318,247 B1
(45) Date of Patent: Nov. 20, 2001

(54) APPLIANCE FOR PREPARATION OF HEATED AND STIRRED BEVERAGES AND FOODS

(75) Inventors: David Di Nunzio, Mentor; Timothy E. Lint, Parma, both of OH (US)

(73) Assignee: Sunbeam Products, Inc., Boca Raton, FL (US)

(*) Notice: Subject to any disclaimer, the term of this patent is extended or adjusted under 35 U.S.C. 154(b) by 0 days.

(21) Appl. No.: 09/054,276

(22) Filed: Apr. 2, 1998

(Under 37 CFR 1.47)

(51) Int. Cl.[7] ............................. A47J 43/04; A47J 37/00; B01F 15/06; B01F 13/04
(52) U.S. Cl. .......................... 99/348; 99/510; 99/287; 366/146; 366/274
(58) Field of Search ..................... 99/348, 510, 287, 99/275; 366/273, 274, 146, 205

(56) References Cited

U.S. PATENT DOCUMENTS

| | | |
|---|---|---|
| 1,480,914 | 1/1924 | Poplawski . |
| 2,070,545 | 2/1937 | Gilbert . |
| 2,143,610 | 1/1939 | Muller et al. . |
| 2,282,866 | 5/1942 | Hagen . |
| 2,502,589 | 4/1950 | Rabjohn . |
| 2,546,949 | 3/1951 | Morrison, Jr. . |
| 2,549,121 | * 4/1951 | Osterheld ........................ 366/274 |
| 2,867,420 | 1/1959 | Potts . |
| 3,028,476 | 4/1962 | Hug . |
| 3,138,370 | 6/1964 | Anderson et al. . |
| 3,219,318 | 11/1965 | Hershler . |
| 3,220,450 | 11/1965 | Aronson, II et al. . |
| 3,279,765 | 10/1966 | Sato et al. . |
| 3,550,657 | 12/1970 | Swanke . |
| 3,554,497 | 1/1971 | Zipperer . |
| 3,863,903 | * 2/1975 | Brehmer et al. .................. 366/274 |
| 4,417,506 | * 11/1983 | Herbst et al. ..................... 99/348 |
| 4,488,664 | 12/1984 | Cleland .............................. 222/56 |
| 4,537,332 | 8/1985 | Brown et al. . |
| 4,577,975 | 3/1986 | McCrory et al. ................ 366/314 |
| 5,048,402 | 9/1991 | Letournel et al. ................. 99/348 |
| 5,063,836 | 11/1991 | Patel .................................. 99/281 |
| 5,074,201 | * 12/1991 | Takeyama et al. ........... 99/348 X |
| 5,090,944 | 2/1992 | Kyo et al. .......................... 464/29 |
| 5,768,978 | * 6/1998 | Dorner et al. ..................... 99/348 |

* cited by examiner

Primary Examiner—Reginald L. Alexander
(74) Attorney, Agent, or Firm—Kramer, Levin, Naftalis & Frankel LLP

(57) ABSTRACT

An appliance for preparation of heated and stirred beverages and foods has a vessel and a base, with a mixing element rotationally driven within the vessel by magnetic coupling with a driving magnet array attached to an electric motor and covered by a cap. The mixing element is mounted on a rolling contact bearing assembly which fits upon a pin which extends from the cap through an opening in the vessel bottom. The vessel bottom is preferably a cast metal piece with internal cavities in which one or more heating elements are mounted whereby a liquid in the vessel is simultaneously heated and stirred or whipped. Electrical power to a mixing motor and heating elements is controlled either by a manually resettable thermostat, or by a self-latching relay controlled switching circuit which includes a blocking diode to supply rectified AC current to the motor for low torque start ups which will not decouple the magnetic flux drive of the mixing element.

34 Claims, 7 Drawing Sheets

APPLIANCE FOR PREPARATION OF HEATED AND STIRRED BEVERAGES AND FOODS

FIELD OF THE INVENTION

The present invention pertains generally to devices that heat and mix, including food preparation appliances and, more particularly, to appliances for preparing food and beverages, including food and beverages which are heated and mixed.

BACKGROUND OF THE INVENTION

Many different types of media mixing devices have been devised, including industrial, chemical and food and beverage mixers and preparation appliances. Blenders have a motor-driven blade mounted at the bottom of a pitcher to chop, stir, whip or blend solids or liquids loaded into the pitcher. Conventionally, the blender blade is mounted directly on a motor shaft, and is removable to allow the pitcher to be removed from a base in which the motor is housed. The motor is electrically driven at various selectable speeds. The necessity to remove the blade, or to mechanically disengage it from the driving shaft prior to removal of the pitcher is problematic.

Some attempts have been made to induce rotation of a mixing element or impeller by magnetic coupling with a mechanically driven magnet array. U.S. Pat. No. 3,554,497 describes a prior art stirring device which has a motor driven magnet in a housing, magnetically coupled to a stirring magnet inside of a vessel. The patent also describes magnetic field induced rotation of a stirring member in a vessel by electronically controlled driving of a fixed magnet array within a housing on which the vessel rests. Described for use in chemical laboratories and being explosion proof, the lack of any mechanical registry of the mixing element allows for irregular rotational motion and decoupling of the magnetic drive.

Some blending or stirring machines have also been provided with a heat source in contact with a vessel or pitcher in which a blade is mechanically rotated, in order to prepare foods or vegetables which are both stirred and heated. A heat source is in such devices located at the bottom of the vessel has the disadvantage of providing rather poor heat distribution through the liquid or food in the pitcher or vessel.

SUMMARY OF THE INVENTION

The present invention provides a food preparation device for stirring and heating liquids or combinations of liquids and solids such as beverages or soups. In accordance with one aspect, the device includes a base which supports a vessel for receiving a quantity of liquid to be prepared as a heated beverage, a vessel bottom having a heating element, and a central opening in the vessel bottom, a motor connected to a shaft, the motor supported by the heater casting to orient the shaft generally orthogonal to the opening in the vessel bottom, the motor shaft supporting a driving magnet array and operative to rotate the magnet array, a cap over of the driving magnet array, the cap having a cap pin in general alignment with the motor shaft, and a mixing element attached to a driven magnet array and mounted for rotation upon the cap pin, rotation of the mixing element upon the cap pin induced by rotation of the driving magnet array by the motor.

These and other aspects of the invention are here in described in particularized detail with specific reference to the accompanying Figures which illustrate representative and preferred embodiments of the various principles of the invention.

DETAILED DESCRIPTION OF PREFERRED AND ALTERNATE EMBODIMENTS

Figure 1:
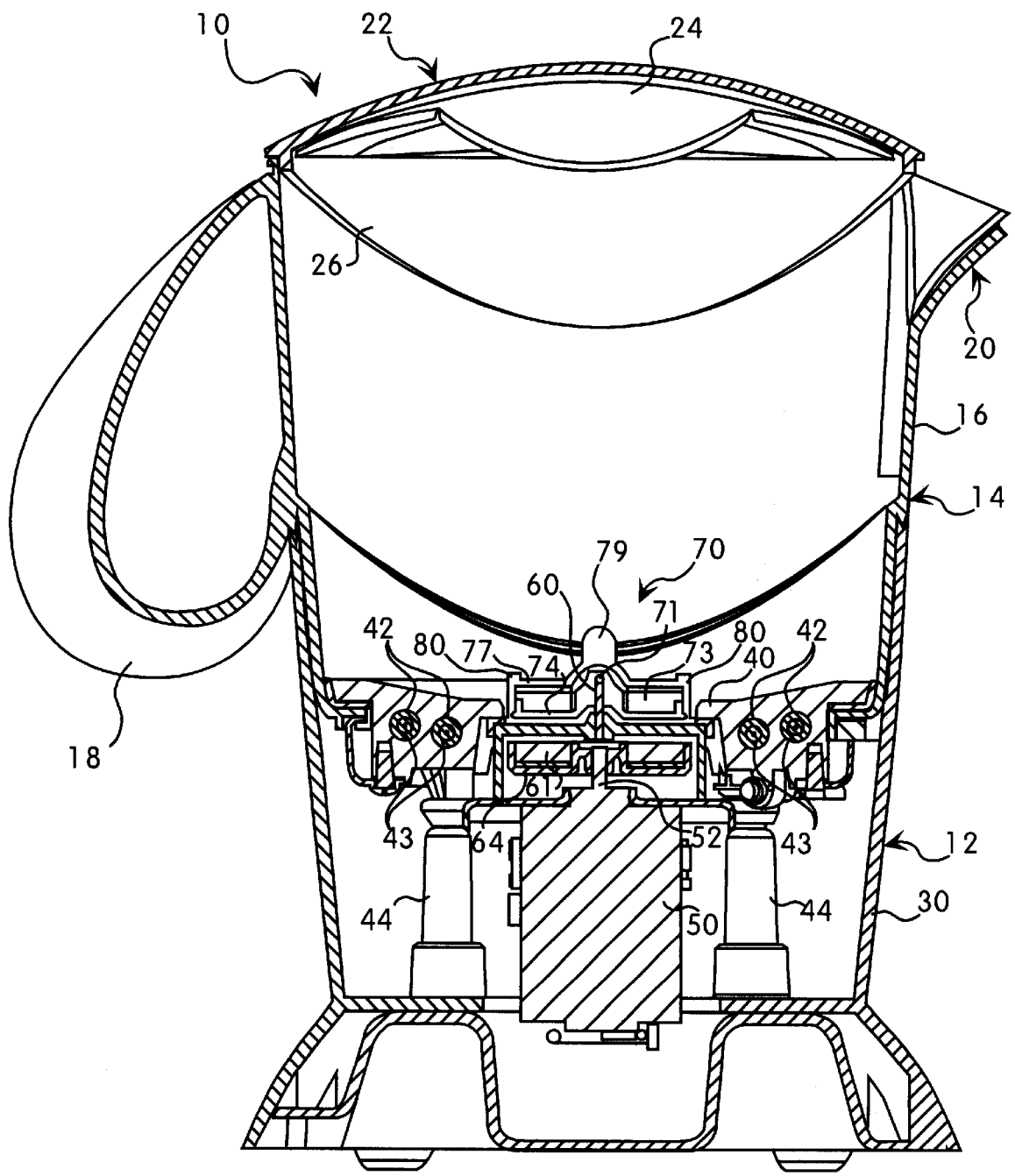
FIG. 1 is a cross-sectional elevational view of a food preparation device in accordance with the present invention.
Figure 2A:
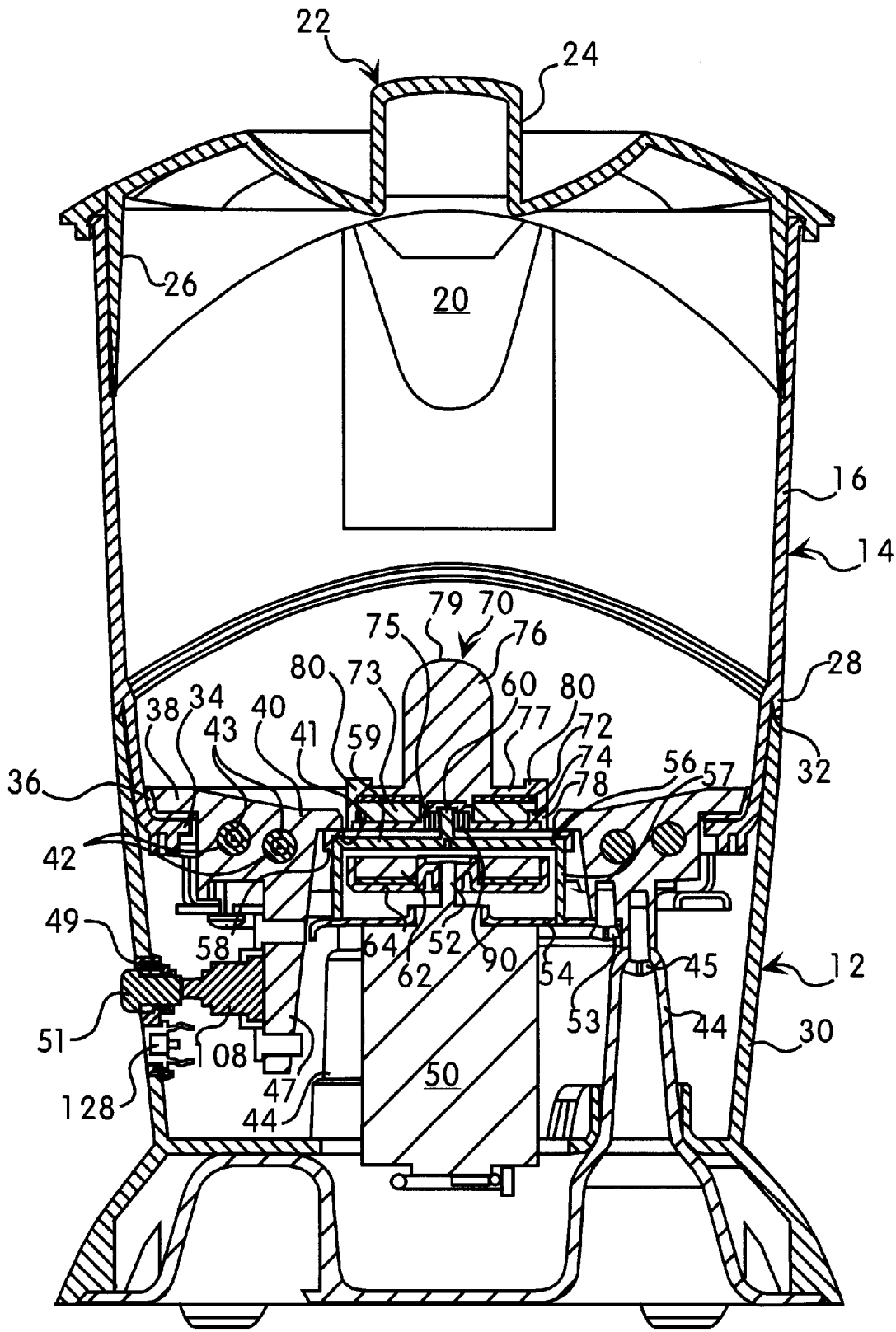
FIGS. 2A and 2B are cross-sectional elevational views of alternate embodiments of the food preparation device of the present invention.
Figure 2B:
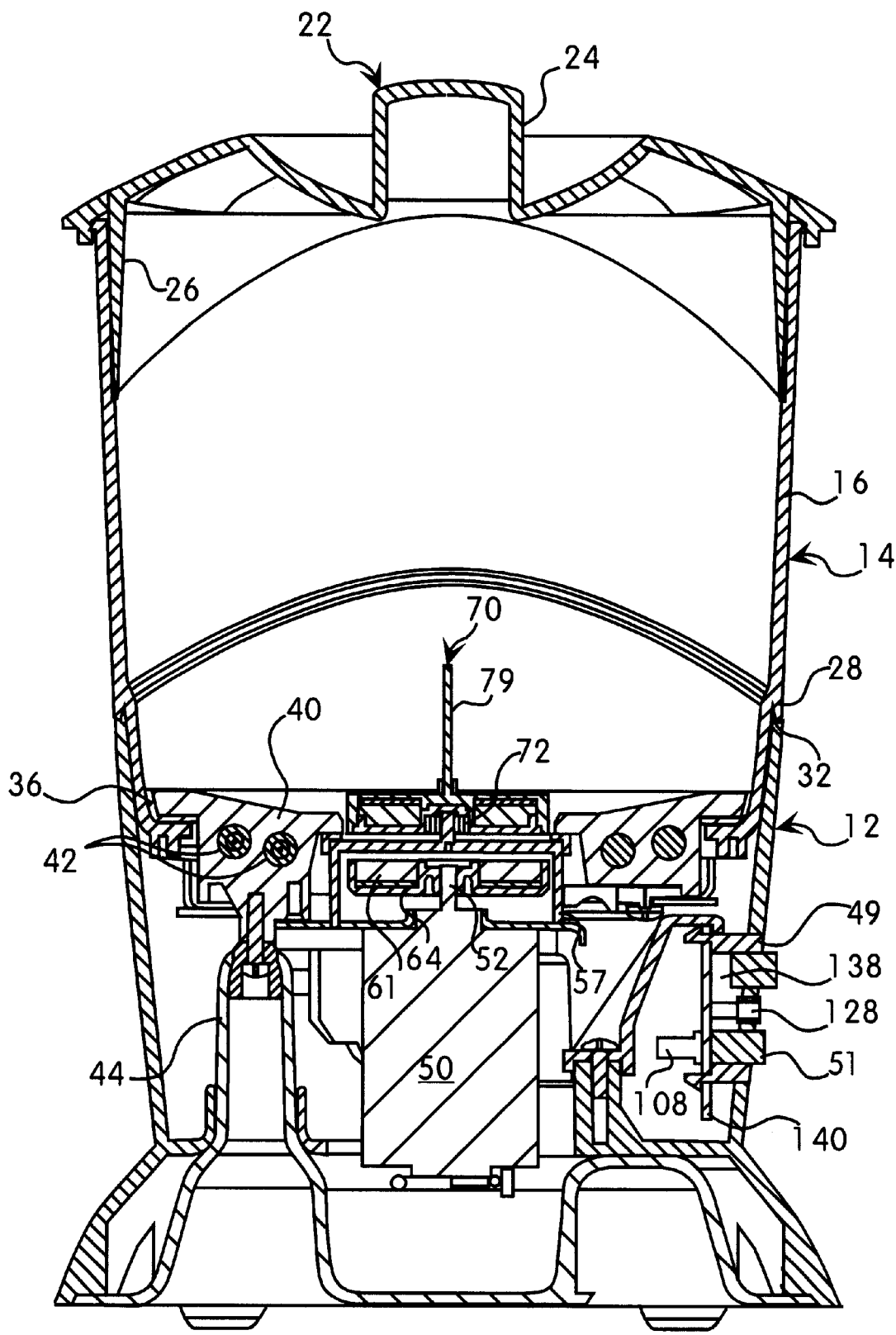

As shown in FIGS. 1, 2A and 2B, the invention is an appliance, indicated entirely at 10, which includes a base section 12 and an upper section 14 in the form of a vessel or reservoir for receiving liquid. The upper section or vessel 14 includes side walls 16, a handle 18 which may be integrally formed with the side walls, and a pouring spout 20 which may also be integrally formed with the side walls. A removable lid 22 covers a top opening of the upper section 14 to provide access to the vessel. The lid 22 may have an integrally formed handle or gripping structure 24 and interference fit flanges 26 which extend into the vessel when the lid is in position over the opening of the vessel.

The base section 12 also has side walls 30 which are substantially flush with the vessel side walls 16. An upper edge 32 of the base section side walls 30 are engaged in an offset groove 28 in the vessel side walls 16 whereby the upper section 14 is supported by the base section 12 about its entire perimeter. Below the offset groove 28, the vessel side walls 16 are interior to the base section side walls 30. The base and upper section side walls may be of any suitable horizontal cross-sectional configuration such as generally circular, oval or other. The vessel side walls 16 terminate at a lower end inside of the base section side walls in a generally perimetric flange 34. A seal 36 is supported by the upper interior surface of the flange 34. On the seal rests a perimetric flange 38 of a vessel bottom 40. In the embodiment of the invention, the vessel bottom 40 is preferably constructed of a metal having good thermal conductivity, and cast with interior cavities 42 in which one or two or more heating elements 43, such as resistive elements in magnesium as well known in the art, are mounted. In a preferred embodiment, the vessel bottom includes two separate cavities 42a and 42b which pass substantially entirely through the vessel bottom, and one of the corresponding heating elements, preferably the inner element 43b, is of much greater resistance and wattage (such as approximately 500 watts) than the outer element 43a (such as approximately 100 watts). Other watt ratings may be employed in accordance with the invention. The use of two different heating elements of differing wattage ratings, one being substantially less than the other, provides a lower voltage tap from the heating element circuit to drive the motor 50, as further described with reference to FIG. 4.

The vessel bottom 40 is also supported by one or more bosses 44 which extend upward from the bottom wall 13 of the base section 12. A fastener 45 such as a screw may be attached to the vessel bottom through the bosses 44.

In a preferred embodiment of the invention, the vessel bottom 40 is generally circular with a slightly concave upper surface and has central circular opening, defined by the perimetrical edge 41, so that the vessel bottom is generally in the form of a ring having an expansive top surface area. The perimetric flange 38 increases the top surface area of the vessel bottom for greater heat transfer to liquid in the vessel. A motor 50 is mounted within the base section 14 so that a shaft 52 which extends from the motor is generally axially aligned with a center of the opening in the vessel bottom 40. As shown, the motor 50 is attached at an upper end to a motor mount 54 which is secured to the underside of the vessel bottom 40 by one or more fasteners 53 such as screws. This provides an integrated unit of the vessel bottom and the motor which can be easily assembled to the combined base and upper sections by insertion of the vessel bottom (with the motor attached) into the vessel and the installation of fasteners 45 through the bottom of the base section.

Attached to the upper side of the motor mount 54 and over the motor shaft 52 is a cap 56. The cap 56 has generally vertical side walls 57 which are greater in height than the extent of the shaft 52 from the motor casing, and a top wall 59 which extends over the entire upper end of the motor casing. A liquid seal 58 is positioned between the cap and the edge 41 about the opening in the vessel bottom. The cap 56 further has a cap pin 60 which is axially aligned with the motor shaft 52 and extends away from the motor and extends at least partially through the opening in the vessel bottom. In other embodiments, the cap shaft may extend entirely through the opening in the vessel bottom, or may not extend at all through the opening in the vessel bottom. An important aspect of the invention is that the cap 56 is made of non-ferrous preferably plastic material which does not interfere with the magnetic coupling of the magnet arrays.

A driving magnet array 62 is attached to the motor shaft by a driving magnet array housing 64 which is preferably in the form of a generally annular disk having multiple cavities in which driving magnets 61 are held. A mixing element assembly, generally indicated at 70, is rotationally mounted upon the cap pin 60. The mixing element assembly 70 includes a driven magnet array 72 supported by a driven magnet array housing 74 which is preferably in the form a generally annular disk having one or more cavities to receive the driven magnets 73. The driven magnet array housing 74 has a central aperture 75 in which the cap pin 60 is received. In the simplest form of the invention, the central aperture 75 of the driven magnet array housing is a generally cylindrical cavity which receives the cap pin 60 and allows the housing to freely rotate about the pin by contact only with the distal end or tip of the pin. In one embodiment, a single ball bearing 71 is positioned on the tip of the cap pin, as shown in FIG. 1, and the central aperture 75 of the housing 74 is placed over the ball bearing to minimize frictional resistance to rotation of the mixing element.

A mixing element 76 is connected to the driven magnet array housing 74 to rotate therewith. The mixing element includes a base section 77 which may be generally disk shaped, and annular downward extending wall 78 which mates with the perimeter of the driven magnet array housing 74, a handle 79, and one or more radial mixing blades 80 which extend from the upper surface of the base section 77. Any shape, size and number of mixing blades which extend from the base section 77 are possible within the scope of the invention. The size, number and shape of the mixing blades are determined according to such factors as the operating rpm of the motor, the strength of the magnetic forces between the driving and driven magnet arrays, and the viscosity of the media placed in the vessel. The present invention is especially well suited for the preparation of whipped hot chocolate. The relatively small size of the mixing element 76 and the mixing blades 79 and 80 in comparison to the volume of the vessel have been found to produce a high efficiency mixing and whipping action of liquid such as milk mixed with a flavoring agent such as cocoa or chocolate, to produce a correct amount of froth on the top of a liquid within the vessel. The wattage of the heating elements 43 is optimally selected to thoroughly heat a liquid within the vessel, and to avoid overheating which can cause scalding and curdling of milk or other beverage ingredients. The mixing element assembly 70 may alternatively be mechanically removably coupled to the motor shaft 52 which would extend through the cap 56 and a suitable seal.

The motor 50 and heating elements 43 are electrically powered by 120 VAC through one of two different types of control circuits described herein. In one version shown in FIG. 2A, the circuit is activated by depressing a spring biased pushbutton 51 mounted in an escutcheon plate 49 in the base wall 30. The pushbutton 51 contacts a manually resettable thermostat 108, mounted to an arm 47 which extends from the vessel bottom 40. FIG. 4C illustrates a simplified schematic for this embodiment, in which power from a standard supply 200 is series connected to the heating elements 43 through a manually resettable thermostat 108. A lamp 204 indicates power is applied, and the motor input voltage is rectified using a full bridge rectifier circuit 206 connected to the motor 50. Alternative embodiments of the control circuit are described herein with respect to FIGS. 2B, 4A and 4B.

Figure 3A:
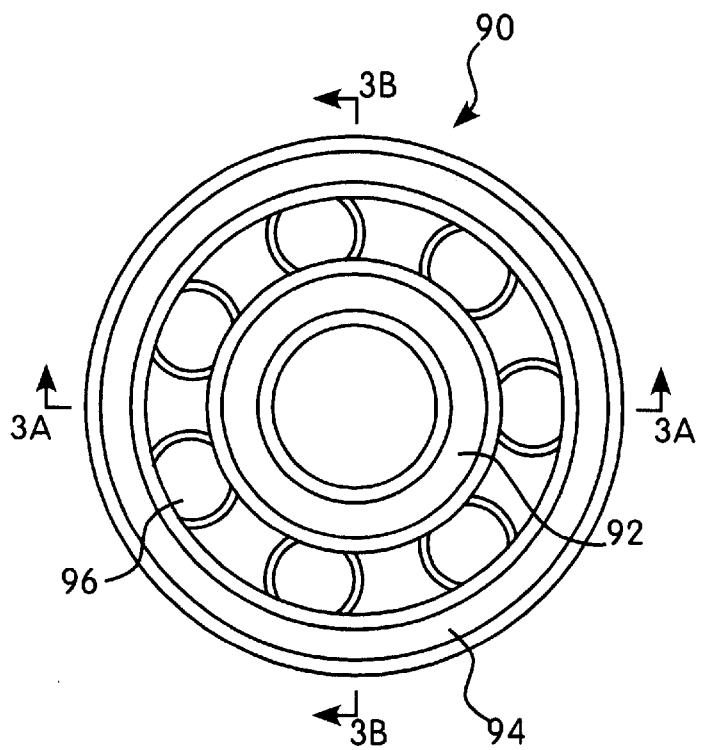
FIG. 3A is a top view.
Figure 3B:
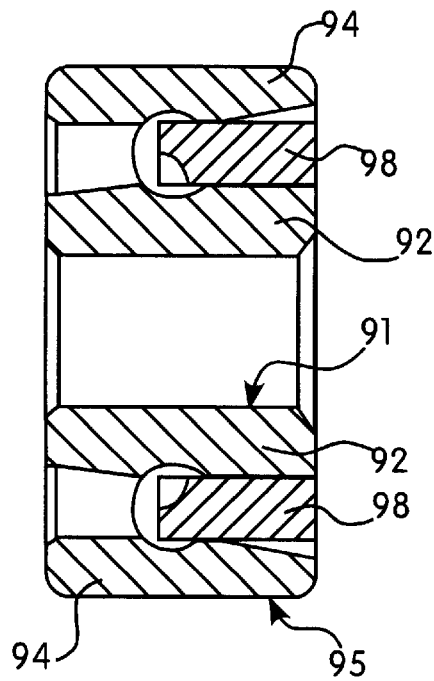
FIGS. 3B–3C are cross-sectional views of a ball bearing assembly in combination with a mixing element in accordance with the present invention.
Figure 3C:
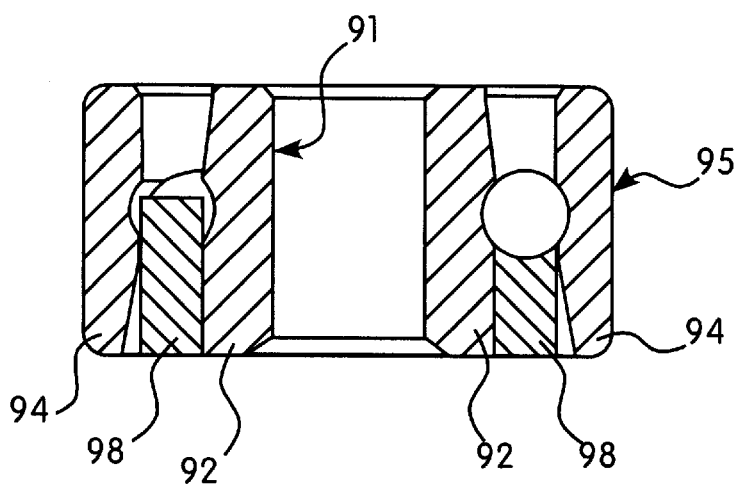

In a particular preferred embodiment of the invention, a rolling contact bearing assembly, indicated generally at 90 and illustrated in isolation in FIGS. 3A–3C, is installed in the central aperture 75 of the driven magnet array housing 74. The bearing assembly 90 includes an inner ring 92, an outer ring 94, balls 96 therebetween, radially separated by cages 98. The internal wall 91 of inner ring 92 is frictionally fit with cap pin 60, and the exterior wall surface 95 of outer ring 94 is frictionally fit or otherwise secured to the interior wall surfaces of the central aperture 75. This arrangement gives the mixing element assembly 70 a high degree of rotational freedom relative to the cap 56, reducing mechanical drag which works against the magnetic flux rotational driving force. For beverages, preferred rotational speeds in the approximate range of 2500 to 3500 rpm are attainable. Other speeds are possible, dependent upon the size of the motor, the magnets, and the impeller, and subject to the viscosity of material in the vessel.

Figure 4A:
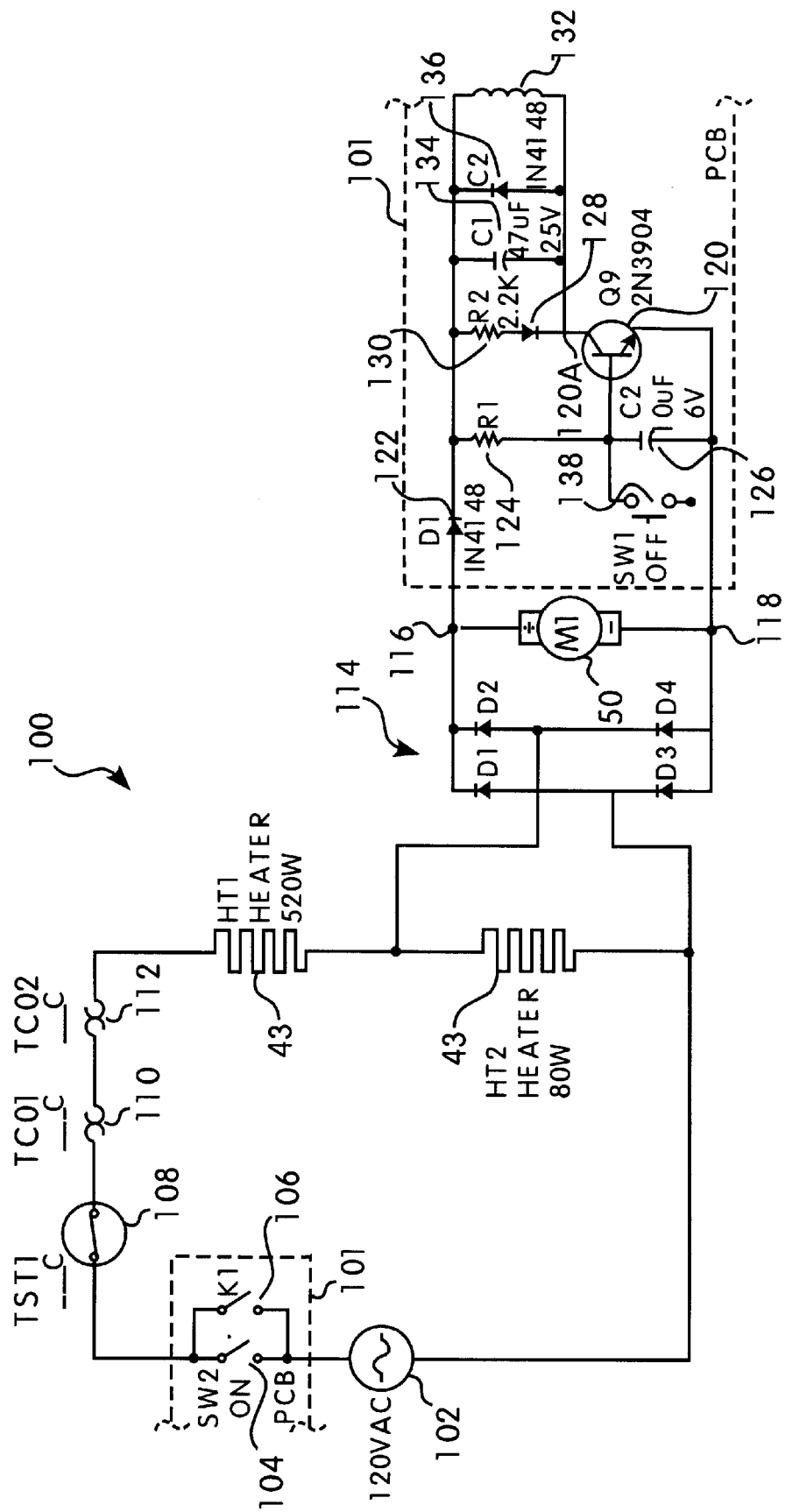
FIGS. 4A and 4B are schematic drawings of a self-latching electrical control circuit for use with the appliance of the present invention.

In one embodiment, power to the heating elements 43 and the motor 50 is controlled by a self-latching circuit 100 schematically shown in FIG. 4A, including the electronics components within the line box 101 which may be mounted upon a printed circuit board 140 (PCB). The circuit 100 can be connected to a standard 120 VAC power supply 102, such as by a standard wall outlet and power cord. The circuit 100 may be made, for example, of discrete components disposed on a printed circuit board and/or other mounting arrangement within the base section 12, or with various of the components integrated into an application specific device. A pair of contacts 104 and 106 are connected in parallel with each other and further in series with a thermostatic device 108 and a pair of thermal permanent cut-off devices 110 and 112. The thermostat 108 may be mounted directly to the vessel bottom 40, as shown in FIG. 2A. Alternatively, the switch and relay contacts 104, 106, and the thermostat 108 may be mounted directly on a printed circuit board 140 mounted within the base section 12 as shown in FIG. 2B and further described below. In this circuit it is preferably an automatic reset type thermostat such as produced by Texas Instruments. Completing the power circuit are the heaters 43 in series with the supply 102.

The first set of contacts 104 are normally open as shown and are controlled by a manually actuated ON push button switch SW2, shown in FIG. 2. The contacts 104 are closed to apply power to the appliance initially. The second set of contacts 106 are also normally open and are part of a control relay K1 as will be described herein. As illustrated in FIGS. 2B and 4A (as well as the alternative embodiment of FIG. 4B), the relay K1 (which includes a coil 132 and contacts 106) can for convenience be mounted on the printed circuit board 140 as part of the electronics components package in the schematic box 101.

A full wave bridge rectifier 114 is provided in parallel with heating element 43a which is the lower wattage (e.g., 80 W) element to provide a suitable tap voltage to the motor 50. The rectifier 114 is conventional in design and consists of four diodes identified in the schematic as D1, D2, D3 and D4. The bridge 114 is in parallel with and provides DC power to the motor 50 across a positive voltage node 116 and a return node 118.

A transistor 120, such as a conventional NPN switching transistor, receives DC power from the bridge 114 through a half wave rectifying blocking diode 122, a base drive resistor 124 and a delay capacitor 126. The transistor 120 collector 120a is connected in series with an LED type light indicator 128 and a current limiting resistor 130. The transistor collector 120a is also in series with the K1 relay coil 132. A filter capacitor 134 and a free wheeling diode 136 are provided in parallel with the relay coil 136 to regulate the DC voltage. A second push button type momentary contact switch 138 is connected in parallel with the delay capacitor 126. The second switch 138 is normally open.

Figure 4B:
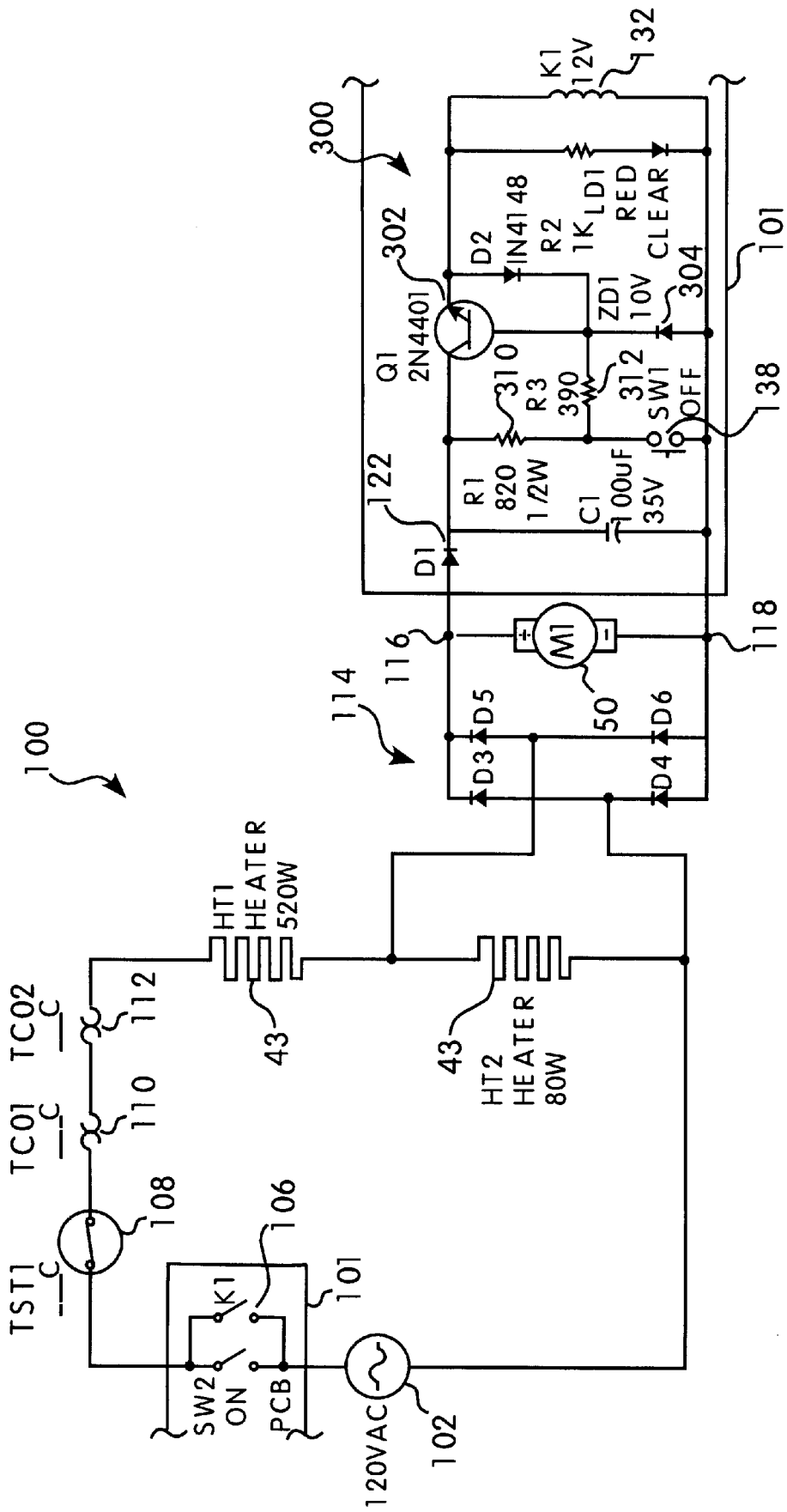
Figure 4C:
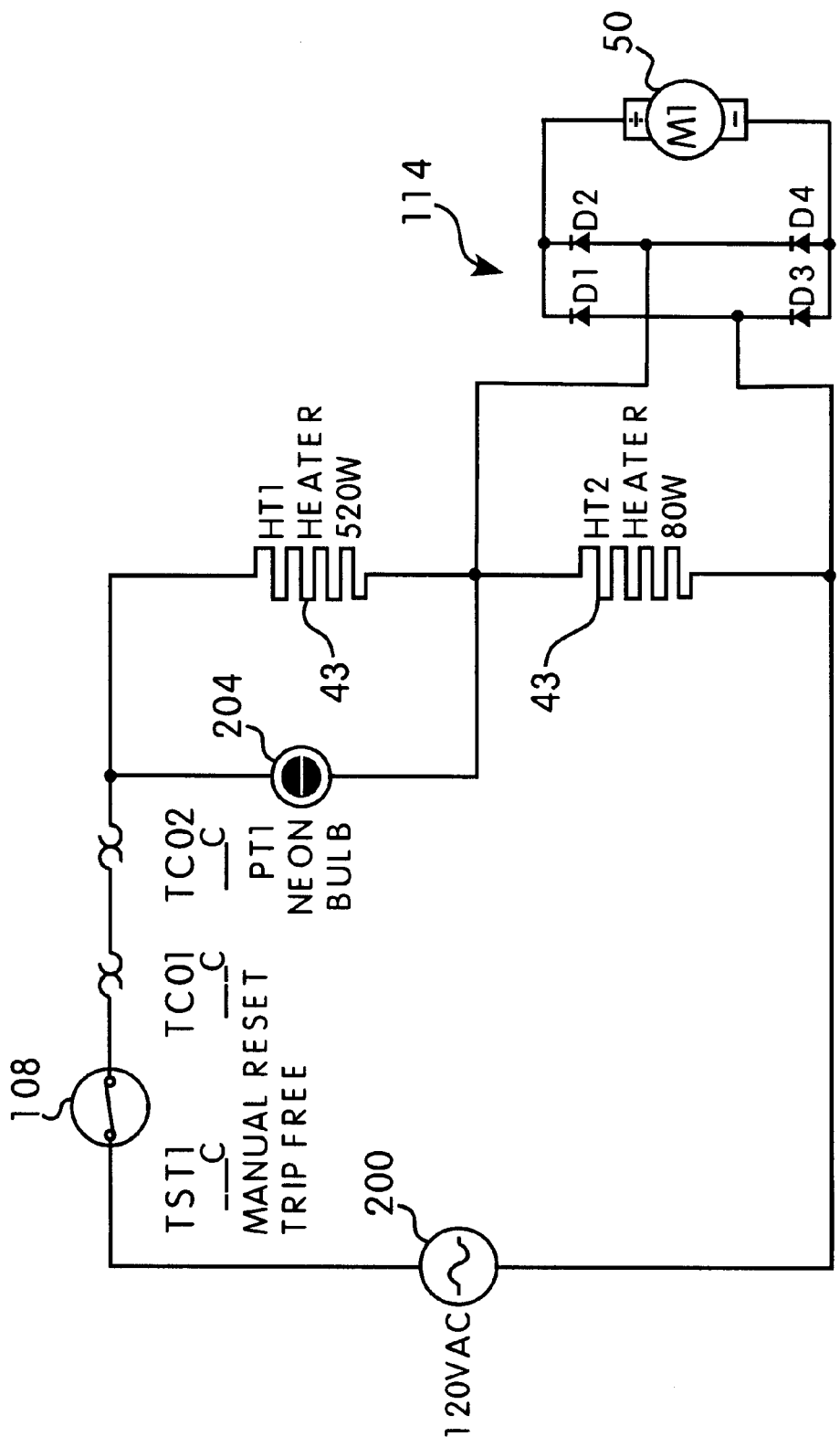
FIG. 4C is a schematic representation of the control circuit shown for use with the appliance of the present invention as shown in FIG. 2A.

The components within the box 101 are preferably mounted upon a printed circuit board 140 which is mounted on a bracket 141 on the interior side of the base wall 30 so that switches 104 and 138 can be actuated from the exterior, for example through escutcheon plate 49, as shown in FIG. 2B. LED 128 is also mounted in the escutcheon plate 49. The resistance and capacitance values set forth on FIGS. 4A and 4B are exemplary only.

In operation, when the power switch SW2 is activated, power is applied to the heaters 43 and the motor 50. DC voltage is also applied to turn on the transistor 120 after a short delay. When the transistor 120 is turned on, it provides current flow through the lamp 128 and the relay coil 132. The lamp 128 provides a visual indication that the appliance is on with power applied. With current through the relay coil 132, the relay contacts 106 close and the relay K1 operates to maintain power to the heaters 43 and the motor 50. If either of the thermocouples opens or if the thermostatic device 108 opens, power is interrupted to the heaters 43 and the motor 50. This loss of power also causes the transistor to turn off, thus extinguishing the LED 128 and also de-energizing the relay K1. Power cannot be re-applied to the appliance until the thermostat 108 is manually reset to a closed condition.

The momentary switch 138 (SW1) can be used as an emergency or manual over ride control switch. When the switch 138 is activated, the contacts thereof short out the capacitor 126, which causes the transistor 120 to turn off. The transistor 120 being off forces the relay K1 to de-energize, thus opening the relay contacts 106 and cutting off power to the appliance. Note that the contacts 104 only momentarily close when the main power switch SW2 is activated, because the relay K1 is used to latch power on for the appliance. This allows the appliance to remain in an "on" condition but with an automatic shut-off function performed by the relay K1 in the event of any electrical overload condition such as motor failure, bearing failure, or locked rotor.

This circuit further provides the advantage of supplying rectified AC voltage to the motor 50, to allow the use of a permanent magnet motor with low initial torque which will not break the magnetic coupling between the driving and driven magnet arrays. This is a distinct advantage over applying a pure DC signal to the motor 50 which, with most relatively small magnet motors, would decouple the magnet arrays, or require the use of a larger motor with larger magnets.

With reference to FIG. 4B, an alternative control circuit 100 is provided that allows for a low voltage operation (wherein like components are provided the same reference numeral as from FIG. 4A). In this embodiment, the relay 132 is connected to a driver circuit 300 that includes a series pass transistor 302 having a collector connected to the cathode of the blocking diode 122 and an emitter connected to the relay K1 coil 132. This transistor configuration is in the form of a series pass regulator. A zener diode 304 is connected between the transistor 302 base and ground, and a resistor pair 310, 312 provide voltage to the transistor 302 base and the cathode of the zener 304. The zener operates to limit the voltage applied to the relay coil 132. The lamp 128 is provided in parallel with the relay coil and is lit when power is applied.

In operation, when the ON switch 104 is actuated, power is applied from the supply 102 to the heater coils 43, the motor 50 through the bridge 114, and the relay driver circuit 300. The transistor 302 turns on in response to the voltage level at the cathode of the diode 122, which in normal or typical operation will produce about 10 volts on the base of the transistor 302 by operation of the zener diode 304. This causes the transistor 302 to operate essentially in a saturated condition, with about 9 volts applied to the relay coil 132. This circuit configuration provides lower sensitivity to line voltage as compared to the circuit of FIG. 4A as the relay 132 will pull in even at low line voltages; whereas in some cases the circuit of FIG. 4A may not provide sufficient power to activate the relay 132 depending on the heater 34 and motor 50 load.

In the control circuit of FIG. 4B, the anode side of the half wave rectifying blocking diode 122 is connected to the heater 43 tap as opposed to the plus side of the motor 50 (as compared to the configuration of FIG. 4A). This improves the performance of the circuit by preventing back EMF from the motor 50 from feeding into the control circuit 300. In the embodiment of FIG. 4A it is possible in some applications that the back EMF from the motor 50 can prevent the circuit 300 from turning off the relay 132 when the switch 138 is actuated relatively quickly. By removing the influence of the back EMF, the embodiment of FIG. 4B operates to disable the relay 132 even with a fast momentary operation of the pushbutton switch 138.

What is claimed is:

1. A device for preparing heated and mixed beverage, the device comprising:

a base underneath a vessel adapted to receive a quantity of liquid to be prepared as a heated beverage, a vessel bottom supported by the base and having a central opening in the vessel bottom, a motor connected to a shaft, the motor supported by the base to orient the shaft generally orthogonal to the opening in the vessel bottom, the motor shaft supporting a driving magnet array and operative to rotate the driving magnet array, a cap over the driving magnet array, the cap having a cap pin in general alignment with the motor shaft, a mixing element attached to a driven magnet array and mounted for rotation upon the cap pin, rotation of the mixing element upon the cap pin induced by magnetic coupling with rotation of the driving magnet array.

2. The device of claim 1 further comprising a driving magnet array housing attached to the motor shaft and having cavities in which magnets of the driving magnet array are located.

3. The device of claim 1 further comprising a motor mount attached to the motor and attached to the vessel bottom.

4. The device of claim 3 wherein the cap over the driving magnet array includes a vertical wall which stands on the motor mount.

5. The device of claim 4 wherein a vertical extent of the vertical wall of the cap is greater than a length of the motor shaft, whereby a top wall of the cap is positioned over the driving magnet array.

6. The device of claim 1 further comprising a seal between the cap and the perimeter of the opening in the vessel bottom.

7. The device of claim 1 wherein the mixing element is attached to a driven magnet array housing which supports magnets of the driven magnet array.

8. The device of claim 1 wherein the mixing element comprises a vertical wall which substantially surrounds the driven magnet array and attaches to the driven magnet array housing.

9. The device of claim 1 wherein the mixing element comprises at least two mixing blades.

10. The device of claim 1 wherein the mixing element comprises a handle and two laterally opposed mixing blades which are smaller in size than the handle.

11. The device of claim 1 wherein the mixing element has only two mixing blades which are opposed one hundred and eighty degrees.

12. The device of claim 1 wherein the mixing element is mounted upon a rolling contact bearing assembly which is attached to the cap pin.

13. The device of claim 1 further comprising a vessel wall and base wall which are substantially contiguous on an exterior of the device.

14. The device of claim 13 wherein the vessel wall comprises a notch in which an upper edge of the base wall is received, whereby the vessel is at least partially supported by the base.

15. The device of claim 13 wherein the vessel wall comprises a lower segment configured to fit inside of the base wall and having an lip adapted to support a flange of the vessel bottom.

16. The device of claim 15 further comprising a seal between the lip of the vessel wall and the vessel bottom flange.

17. The device of claim 1 further comprising at least one boss in the base which is attachable to the vessel bottom.

18. The device of claim 1 wherein the cap is made of a non-ferrous material.

19. The device of claim 1 further comprising at least one heating element in thermal contact with the vessel bottom.

20. The device of claim 1 further comprising two heating elements in the vessel bottom, wherein a wattage rating of one heating element is substantially less than a wattage rating of the other heating element.

21. The device of claim 1 further comprising an electrical power and control circuit operative to supply and control electrical power to the motor and to heating elements in thermal contact with the vessel bottom, the circuit including a connection to a 120 volt AC power supply, two resistor heating elements wherein a wattage rating of one heating element is substantially less than a wattage rating of another heating element, a full wave bridge rectifier having four diodes and connected in parallel with the heating element of lesser wattage and connected to an electric motor, and a manually resettable thermostat.

22. The device of claim 1 further comprising an electrical power and control circuit operative to supply and control electrical power to the motor and to heating elements in thermal contact with the vessel bottom, the circuit including a connection to a 120 volt AC power supply in series with an automatic reset thermostat and two resistor heating elements, one of the heating elements having a wattage rating less than a wattage rating of the other heating element, a full wave bridge rectifier having four diodes and connected in parallel across the heating element of lesser wattage and connected to an electric motor, and a self-latching relay-controlled circuit connected in parallel to the motor, the self-latching relay controlled circuit including a relay control switch connected in parallel with a free wheeling diode, a filtering capacitor, and a current limiting resistor and an LED, the relay connected in series to a collector of a transistor, a base of the transistor connector to receive direct current from the bridge through a blocking diode and a delay resistor, the base further connected to a first pole of a switch which is in parallel with a delay capacitor 126, a second pole of the switch connected to the bridge.

23. The device of claim 1 further comprising a lid adapted to cover a top opening to the vessel.

24. The device of claim 21 wherein the lid comprises a gripping structure and at least one flange configured to fit within the vessel wall.

25. The device of claim 1 wherein the vessel comprises a pouring spout.

26. The device of claim 1 wherein the vessel bottom is generally concave.

27. A mixing apparatus comprising:

a vessel for receiving at least one substance to be heated and stirred, the vessel having a vessel bottom with a central opening, a base which supports the vessel and the vessel bottom, and a motor, the motor having a shaft which is generally axially aligned with the central opening in the vessel bottom, a driving magnet array attached to the motor shaft, a cap surrounding the driving magnet array, a cap pin extending from the cap and generally axially aligned with the motor shaft and with the central opening in the vessel bottom, a mixing element assembly having an array of driven magnets and an opening for receiving a distal end of the cap pin, the driven magnet array of the mixing element assembly being magnetically coupled with the driving magnet array attached to the motor shaft, whereby a mixing element of the mixing element assembly is rotated upon rotation of the driving magnet array attached to the motor shaft.

28. The apparatus of claim 27 further comprising at least one heating element in thermal contact with the vessel bottom.

29. The apparatus of claim 27 comprising first and second heating elements in thermal contact with the vessel bottom, the first heating element having a wattage rating substantially less than the second heating element.

30. The apparatus of claim 27 wherein the first and second heating elements are located in cavities in the vessel bottom, and the first heating element is located radially outside of the second heating element.

31. The apparatus of claim 27 wherein an electrical connection to the motor is in parallel with the first heating element.

32. The apparatus of claim 27 further comprising a seal between the cap and the opening in the vessel bottom.

33. The apparatus of claim 27 wherein the mixing element assembly comprises a driven magnet array housing having a cavity for receiving magnets of the driven magnet array, and a mixing element attached to the driven magnet array housing, the mixing element having at least one blade which extends away from the driven magnet array.

34. The apparatus of claim 27 further comprising an electrical power and control circuit operatively connected to the motor and the heating element, the circuit comprising a relay activated power control circuit in parallel with a resistor heating element.

* * * * *